United States Patent [19]

Chazalnoël

[11] Patent Number: 4,703,584
[45] Date of Patent: Nov. 3, 1987

[54] SLIDING VINE POST AND METHOD

[75] Inventor: Claude Chazalnoël, Barbezieux, France

[73] Assignee: Les Toles Inoxydables et Speciales Ugine Gueugnon, Levallois Perret, France

[21] Appl. No.: 762,375

[22] Filed: Aug. 5, 1985

[30] Foreign Application Priority Data

Aug. 7, 1984 [FR] France ................... 84 12888

[51] Int. Cl.$^4$ ............................................. A01G 17/06
[52] U.S. Cl. ............................................. 47/46; 47/47
[58] Field of Search .................. 47/47, 46, 44, 45, 70; 248/354.5, 407, 223.4, 224.4

[56] References Cited

U.S. PATENT DOCUMENTS

| 44,104 | 9/1864 | Mason | 47/46 |
| 918,579 | 4/1909 | Murch | 47/47 |
| 1,227,105 | 5/1917 | Barnes | 47/47 |
| 1,241,760 | 10/1917 | Penn | 248/156 |
| 2,446,255 | 8/1948 | Vocisano | 248/354.5 |
| 3,066,447 | 12/1962 | Reiterer et al. | 47/47 |
| 3,165,863 | 1/1965 | Duran | 47/47 |
| 3,807,089 | 4/1974 | Senese | 47/46 |
| 4,021,965 | 5/1977 | Norris | 47/47 |
| 4,536,989 | 8/1985 | Caywood et al. | 47/46 |

FOREIGN PATENT DOCUMENTS

| 2636731 | 2/1926 | Fed. Rep. of Germany . |
| 425376 | 2/1926 | Fed. Rep. of Germany . |
| 1714193 | 10/1937 | Fed. Rep. of Germany . |
| 738510 | 8/1943 | Fed. Rep. of Germany . |
| 1864946 | 11/1959 | Fed. Rep. of Germany . |
| 2004082 | 1/1970 | Fed. Rep. of Germany . |
| 1193923 | 11/1959 | France . |
| 1600580 | 9/1970 | France . |
| 189071 | 10/1937 | Switzerland . |
| 2108812 | 5/1985 | United Kingdom ............... 47/47 |

Primary Examiner—Robert A. Hafer
Assistant Examiner—Bradley M. Lewis
Attorney, Agent, or Firm—Oblon, Fisher, Spivak, McClelland & Maier

[57] ABSTRACT

The invention pertains to the area of vine growing and specifically with posts or trellises for attached vines. The vine post in the invention includes a lower post with the support means for the training wires and holes allowing the passage of a cross pin and an upper part sliding with respect to said lower post and supported by said pin. This upper part has, at its upper end, means of support for at least two raising wires. The utilization of the vine post in the invention notably facilitates mechanized cutting operations, through the lowering of its upper sliding part. The components of the vine post in the invention are advantageously made of inoxidizable steel.

16 Claims, 6 Drawing Figures

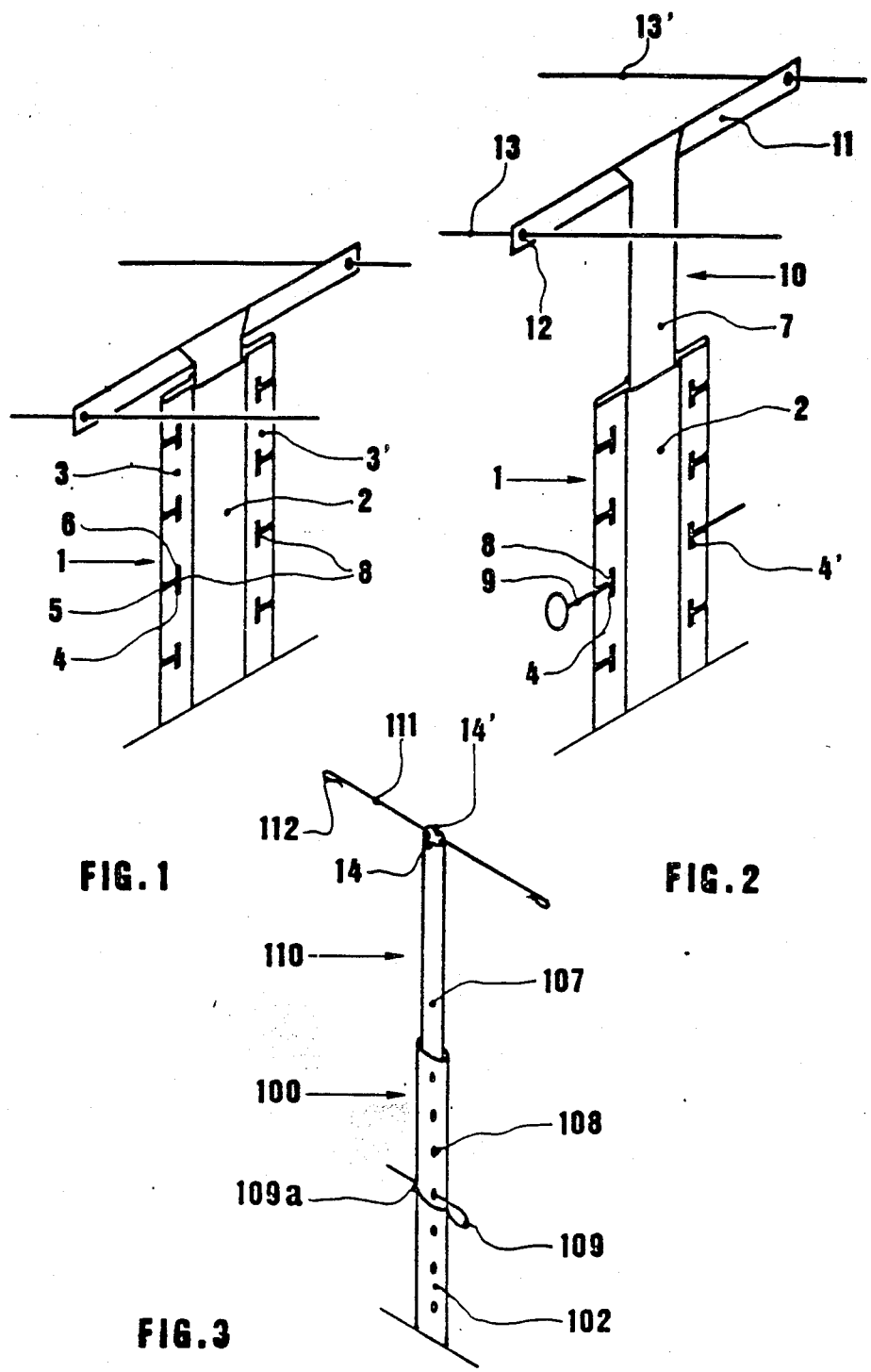

SLIDING VINE POST AND METHOD

BACKGROUND OF THE INVENTION

1. Field of the Invention

This invention relates to vine growing and more particularly to supports which are utilized for this growing and a method for the use thereof.

2. Discussion of the Background

In an effort to reduce labor costs, vine-related work is becoming increasingly mechanized, and vines are more and more often attached in a manner so as to allow the passage of machines or vehicles between the rows of vine bases.

During the growth of vine branches, two or three cutting or trimming operations take place successively:
   trimming or "dressing" in winter,
   a sickling (a short time before the wine harvest, to remove excess foliage which would cause problems during the harvest) is normally performed at a level higher than the vine posts or trellises,
   the grape harvest itself.

During the growth of the vine, long, high, leafy stems grow. To allow the vehicles to continue to circulate, these high stems are brought closer to the rows of the vine bases using "raising wires". The high stems are thus typically enclosed with two "raising wires" located at approximately the same level and enclosing each row of vine bases. These raising wires are hooked into notches in the fence posts or vine poles, and are raised as the vine grows.

For dressing, the raising wires are eliminated, but the posts which supported these raising wires as well as the other wires or "training wires" remain. These are cumbersome because they exceed the trimming height, and the cutting machines have to be carefully maneuvered to avoid the posts and achieve a complete cutting. This hindrance due to the posts which are as high as the highest level of the raising wires causes significant time loss. This problem existed in manual cutting, but is now much more pronounced with mechanized cutting.

No document known to the applicant leads to a solution to the problem presented. West German Patent application DE-A No. 3 203 398 discloses the fixing of the position of vine branches with a vine wire which utilizes a specially shaped clamp. However, such a clamp does not provide a solution to the difficulty with mechanized cutting since the poles which support the raising wires are still too high and get in the way of cutting operations.

Thus there remains a strongly felt need for a vine support means which does not hinder the process of trimming or cutting the vines.

SUMMARY OF THE INVENTION

Accordingly, one object of this invention is to provide a novel vine post and method which is useful in supporting vines.

It is another object of this invention to provide a vine post and method for the support of vines which permits the free passage of vine-related work machine or vehicles between rows of vines.

It is another object of this invention to provide a novel vine post and method which supports vines and which does not hinder or inconvenience the trimming or cutting of vines.

These and other objects have been surprisingly satisfied with the vine post of this invention. This vine post is equipped with a means to support vine wires, such as training wires normally fixed during the growth of vines and raising wires located higher and at variable levels. This post is made up of a lower post and an upper part sliding with respect to this lower post. This post is characterized in that it includes a hollow section holding the support means for the training wires. This post also possesses transverse holes which allow the passage of at least one pin to support the upper part at different heights. This post also contains an upper part which includes a smooth, cylindrical rod which is circular sectioned, and which slides inside the lower post. The upper part also possesses a cross piece with, towards its end, two support means for two raising wires.

The invention is based on the idea of separating the cumbersome top part of the pole which supports the raising wires from the lower portion of the pole, and to form a part for relative sliding of the two.

The vine post of the invention is made of (1) a lower post which includes, on one hand, a means of support for the training wires (wires which are fixed during the growth of the vine) and, on the other hand, holes which allow the passage of a cross pin, and (2) an upper part, which slides with respect to the lower post and which is supported by the aforementioned cross pin. The height of the upper part is regulated by inserting the pin in one of the holes in the lower part. The upper part has, towards its upper end, a means for supporting at least two raising wires. The means for supporting the training wires may be the holes for the passage of the cross pin or pins.

As the vine grows, the sliding upper part is raised and shifted to a higher level by a pin which crosses through the lower post or the "training post" through one of its holes.

The upper part can slide either outside of the lower post or inside the lower post. The sliding of the upper part of the post inside the lower post is preferred for practical reasons: to obtain satisfactory rigidity and simplicity of construction.

The vine post of the invention thus preferably has a lower post including a hollow section holding the support means for the training wires as well as transverse holes allowing the passage of at least one pin to support the upper part at different levels. The upper part has a part including a smooth cylindrical rod which is circular sectioned, sliding inside the lower post, as well as, towards the top of said rod, a crosspiece with, towards its ends and at chosen intervals, two means of support for the two raising wires, such means comprised, for example, of eyelets or clamps. The lower post can be pointed to facilitate its installation in the ground.

Here, it is the successive cross holes which allow, along with the end of the sliding rod of the upper part, the regulation of the successive levels of the two raising wires and it is the intervals separating the eyelets or notches which control the space separating these raising wires.

It is possible to provide, without departing from the framework of the invention, the support of two raising wire couples at different levels, either by two crosspieces supported at two different levels by the sliding rod of the upper part, or by a single crosspiece with means of support for the raising wires at its ends, at two levels. Such a post allows the doubling of the number of raising wires and thus the improvement of the raising of the long upper branches of the vine.

While the vine is growing and for dressing operations, the cross-piece or crosspieces supporting the raising wires are placed transversally with respect to the vine row. The two raising wires or raising wire couples are raised or lowered at the same time by acting on the sliding rod of the upper part of the vine post and on the cross pin which supports it. To raise the raising wires, the sliding rod is raised and the pin placed in a hole at a higher level. The successive transverse holes in the lower post can be located every 8 to 15 cm. To lower the raising wires during cutting, the sliding rod is raised slightly and the support pin is removed. The upper part is then retained by its crosspiece which applies pressure on the upper end of the lower part, or is supported by a pin in another transverse hole located in a lower position.

If the transverse position of the crosspiece or crosspieces is normally not cumbersome for dressing, it is, on the other hand, cumbersome for the wine harvest effected with threshing vehicles, during which it is preferable to orient the cross piece or crosspieces longitudinally with respect to the vine row.

This longitudinal orientation as well as the transverse orientation of the crosspiece may be obtained if the sliding rod which supports them can be oriented freely with respect to the lower post on which it slides. In particular, the sliding sliding rod is externally cylindrical and, preferably, it slides with a small clearance inside the lower post.

The tightened raising wires are released to allow the rotation of the crosspiece during the wine harvest, and it is necessary to provide the means to attach these raising wires to the vertical part of the vine post or near this vertical part, for example, in the form of two notches borne by the upper end of the sliding rod.

In addition, one can then attach the raising wires to the highest support means for the training wires on the lower post.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an orthogonal view from above of a first example of the vine post according to the invention, with the sliding rod retracted and the crosspiece in the low position;

FIG. 2 is an orthogonal view from above of the same vine post, with a sliding rod in the crosspiece at a high position;

FIG. 3 is an orthogonal view from above of a second example of the vine post;

DETAILED DESCRIPTION OF THE PREFERRED EMBODIMENTS

Figure 4:
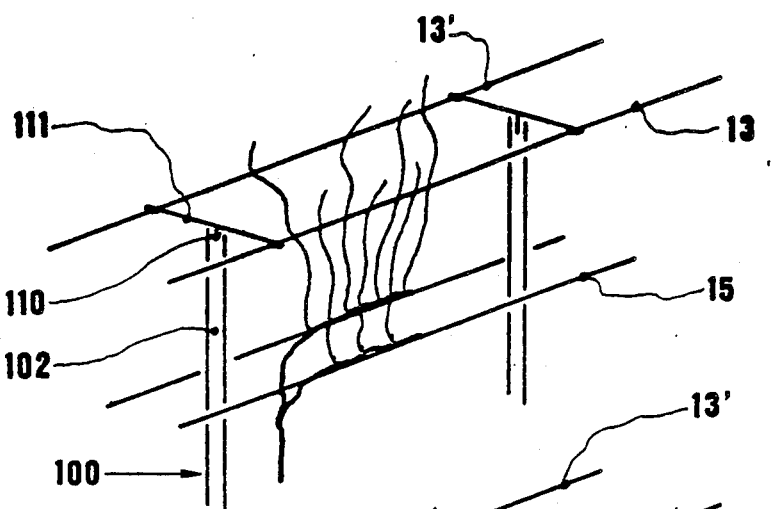
FIGS. 4, 5 and 6 are schematic orthogonal views from above of the position of the sliding rod and the crosspiece of the two posts according to the invention, installed in a row of vines at different growth stages of the vine.

Referring now to the drawings, wherein like reference numerals designate identical or corresponding parts throughout the several views, the post (1) according to the invention shown by FIGS. 1 and 2 includes a lower post (2) having a two-wing section or flaps (3, 3') obtained by folding and is not completely closed so as to define a central passage. Multiple notches (4) arranged in the flaps (3, 3') each have a horizontal slot (5) for a training wire, and a vertical slot (6) allowing the wire from the slot (5) to be moved according to the irregularities in the ground level of the vineyard. At the end of the slot (5), a hole (8) extends to the interior of the central passage of the lower pole (2), within which the cylindrical rod (7) slides. The notches (4) and (4a) of the two wings correspond in level. The notches include, at the same time, both the means of support for the training wires (wires not shown) and cross holes (8) allowing the passage of the pin (9) which, in FIG. 2, extends into the central passage and supports the cylindrical rod (7) in a vertical position by engaging the bottom end of the rod (7) resting thereon.

The upper part (10) of the vine pole (1) includes the cylindrical rod (7), which is hollow and of right oval or circular section sliding inside the lower pole (2). Attached to the top of the rod (7), for example, by crimping, is a crosspiece (11) comprised of a narrow plate with two holes or eyelets (12) near its ends, for supporting the two raising wires (13, 13'). The length of the sliding rod (7) is typically between 600 and 900 mm and the length of the crosspiece (11) in the neighborhood of the spacing of the eyelets (12) and thus of the raising wires (13, 13'), is from 250 to 300 mm. The lower pole (2) and the sliding rod (7) are both made of inoxidizable ferritic steel, (stainless steel) 17% Cr (ANFOR "Z8C17" or AISI430), 0.8 mm thick, and the crosspiece (11) is a plate of the same grade, 0.8 mm thick and 30 to 40 mm wide. The choice of inoxidizable steel is particularly important in the case of the two sliding parts (2) and (7), because it allows the avoidance or the limitation, for a long period of time, of the development of rust or corrosion products which would hinder or prevent the sliding of the sliding rod (7) inside the lower pole (2).

The second example of the vine pole (100) according to the invention (FIG. 3) includes a lower pole (102) made of a cylindrical circular tube and bearing a series of transverse holes (108) spaced 10 cm apart, each hole (108) allowing the passage of either a training wire or a pin (109). The pin (109) includes a safety device (109a) which prevents the accidental ejection of the pin from the pole (102) by the wine harvesting machine threshers. It is preferred to utilize such type safety pins to avoid ejection of the pins, which would result in abrupt local collapse of the upper part of one or several sliding vine poles according to the invention, and the raising wires which they support.

The upper part (110) of the vine pole (100) has a smooth tube (107) sliding inside the lower tube (102) with a diameter clearance of less than 1 mm, and a crosspiece (111), whose middle is bent and inserted in the upper end of the tube (107). The ends of the crosspiece (111), a crosspiece which is made from a flat surface made of stainless steel with 17% Cr, are shaped into lower half-loops (112) to support the raising wires (13, 13') (FIG. 4) and to retain them when they are pushed back towards the outside by the growth of vine's high branches and foliage. The bent middle portion of the crosspiece (111) inserted in the end of the tube (107) leaves passage space for the attachment of the raising wires (13, 13') in two notches (14') in upper sliding part (110) which are more or less aligned according to the longitudinal axial plane of symmetry of the tubes (102) and (107). These vertical notches (14') are 1 to 1.2 mm wide and 3 to 4 mm deep, so as to support and retain two raising wires (13) and (13') made of cold-worked inoxidizable steel, 0.8 to 1.0 mm in diameter, when these wires are brought close to the median longitudinal vertical plane of the row of vines before the passage of the harvesting machine, the crosspieces (111) then being turned and oriented more or less according to this same plane, as shown diagramatically by FIG. 6.

Figure 5:
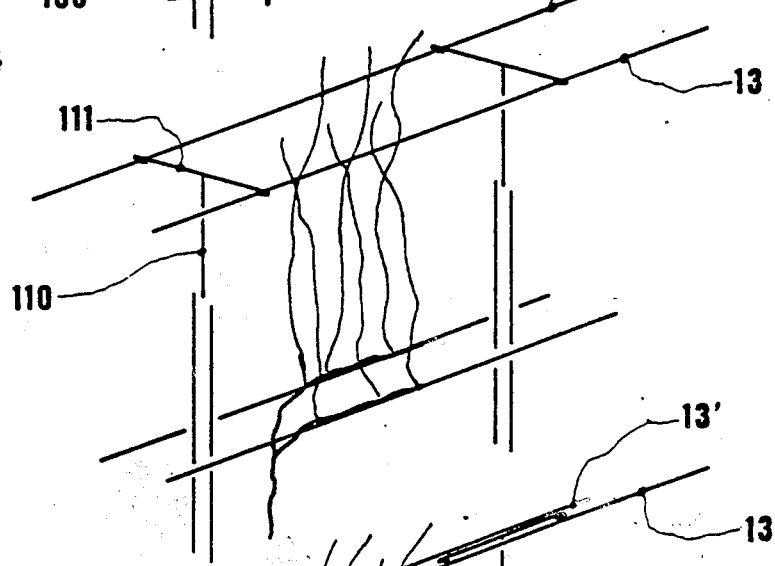
Figure 6:
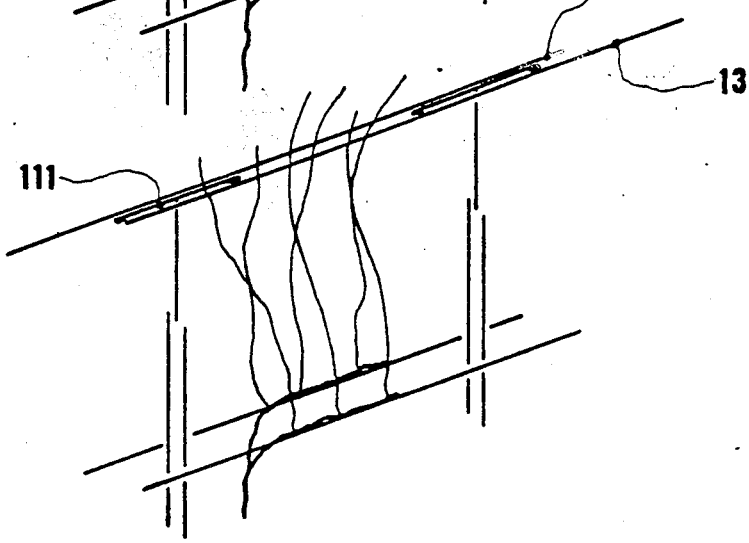

FIGS. 4 through 6 are the position diagrams illustrating the operation of the upper sliding part (110) of the vine pole according to the invention (100). After the dressing and until spring, the tubes (107) are retracted downward, the crosspieces (111) placed transversally and the raising wires (13, 13') which they support are in low position (FIG. 4). The base branches of the vine can be in part attached to the training wires (15), themselves supported by the lower pole (102) (means of support not represented). As the vine grows (FIG. 5), normally in summer, the upper sliding parts (110) are progressively raised and supported by the movement of the support pins such as (109) (FIG. 3). The raising wires (13, 13') are supported by the crosspieces (111) in transverse position containing the branches and foliage of the vine within the vine row.

When it is time to harvest (FIG. 6), the raising wires (13, 13') are brought close together on the median longitudinal vertical plane of the vine row and placed in the notches (14, 14') (FIG. 3) of the upper sliding parts (110) as the upper sliding parts (110) are turned approximately 90 degrees to orient the crosspieces (111) longitudinally, which allows the harvesting equipment threshers to operate close to the vine posts (100).

The vine posts in the invention are well-adapted to mechanized vinework. To facilitate their installation, to obtain satisfactory, durable service from them and to reduce their initial cost, it is important to utilize rigid materials for their construction, which are resistant to corrosion due to atmospheric conditions and vine treatment products. The components of the post in the invention are advantageously made of inoxidizable ferritic steel.

The lower post is normally made from a tube or hollow section of inoxidizable steel, between 0.5 and 2 mm thick. The sliding cylindrical rod for the upper part of the vine pole is normally made from a section or a tube, which also is preferably made of inoxidizable steel, with thickness between 0.6 and 1.5 mm. And the crosspiece for the sliding upper part is preferably made of a portion of a tube or a flat piece of inoxidizable steel, attached to the upper end of the sliding cylindrical rod.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vine post for supporting vine wires, comprising:
    a lower post, said lower post having a longitudinally extending central passage, longitudinally spaced means for supporting vine wires in at least two levels and transverse hole means on at least two levels for allowing passage of an upper part support pin into said central passsage in at least two levels;
    an elongated, tubular upper part having one end insertable in said central passage and being sized and shaped for permitting said upper part to rotate and to move in the direction of said central passage, whereby said upper part may be rotatably supported in said central passage by said support pin;
    at least one cross piece having a middle portion fixed to another end of said upper part, each said cross piece extending transverse to said longitudinal axis and having wire support means,
    wherein said another end of said cylindrical circular rod upper part includes two notches for supporting said wires, wherein said crosspiece comprises an elongate metallic flat piece having a bent middle portion inserted in said another end of said upper part and between said notches, and wherein said flat piece has ends including means for supporting said wires, whereby wires supported by said supporting means at said end of said flat piece may also be supported by said notches upon rotation of said upper part during harvesting.

2. A vine post according to claim 1, wherein said upper part comprises a cylindrical circular rod.

3. The vine post according to claim 1 wherein said lower post is made from a hollow section of stainless steel, with a thickness between 0.5 and 2 mm.

4. The vine post according to claim 1 wherein said upper part is made of a stainless steel section or tube, with thickness between 0.6 to 1.5 mm.

5. The vine post according to claim 4, wherein said crosspiece is made of a piece of a stainless steel member attached to said another end.

6. The vine post according to claim 2 wherein said lower post is made from a hollow section of stainless steel, with a thickness between 0.5 and 2 mm.

7. The vine post according to claim 2 wherein said upper part is made of an stainless steel section or tube, with thickness between 0.6 to 1.5 mm.

8. The vine post according to claim 7, wherein said crosspiece is made of a piece of stainless steel member attached to said another end.

9. The vine post according to claim 1 wherein said transverse hole means are formed in a portion of said means for supporting vine wires.

10. A method for supporting vines by wires using a a sliding vine post including a lower post fixed in the ground and an upper post vertically slidably supported by said lower post, said upper post including a vertical post and at least one crosspiece at a top thereof, said crosspiece being rotatable about the longitudinal axis of said lower post, comprising the steps of:
    positioning said upper post at a low position on said lower post with said crosspiece extending transverse to the length of a row of vines;
    supporting portions of said vines on raising wires supported at ends of said crosspiece;
    raising said upper post as said vines grow;
    rotating said crosspiece into alignment with said row of vines during harvesting to permit passage of machinery; and
    supporting said raising wires at said vertical post of said upper post when said crosspiece is rotated into alignment with said row of vines.

11. The method of claim 10, wherein said step of supporting said raising wires at said vertical part comprises supporting said raising wires in notches at a top of said upper post.

12. The method of claim 10 including the step of supporting other portions of said vines on training wires supported by said lower post.

13. The method of claim 11 including the step of supporting other portions of said vines on training wires supported by said lower post.

14. The method of claim 10 including the step of lowering said upper part to said low position during cutting of said vines.

15. The method of claim 11 including the step of lowering said upper part to said low position during cutting of said vines.

16. The vine post of claim 1 wherein said supporting means at said ends of said flat piece comprise said ends of said flat piece being bent into loops.

* * * * *